(12) United States Patent
Shang et al.

(10) Patent No.: US 8,676,749 B2
(45) Date of Patent: Mar. 18, 2014

(54) STATEMENT LOGGING IN DATABASES (75) Inventors: Heping Shang, Walnut Creek, CA (US);
Elena Isabel Lora-Gallardo,
Montrouge (FR); Andrzej Sarapuk,
Argenteuil (FR)

(73) Assignee: Sybase, Inc., Dublin, CA (US)

( * ) Notice: Subject to any disclaimer, the term of this patent is extended or adjusted under 35 U.S.C. 154(b) by 854 days.

(21) Appl. No.: 12/183,843

(22) Filed: Jul. 31, 2008

(65) Prior Publication Data

US 2010/0030824 A1 Feb. 4, 2010

(51) Int. Cl.
*G06F 17/30* (2006.01)

(52) U.S. Cl.
USPC .......................................... 707/610; 707/615

(58) Field of Classification Search
USPC ........... 707/610, 611, 633, 999.202, 999.204, 707/615, 999.107, 999.203
See application file for complete search history.

(56) References Cited

U.S. PATENT DOCUMENTS

| | | | | |
|---|---|---|---|---|
| 5,434,994 A * | 7/1995 | Shaheen et al. | ................ | 709/223 |
| 5,926,819 A * | 7/1999 | Doo et al. | .............................. | 1/1 |
| 6,014,674 A * | 1/2000 | McCargar | .............................. | 1/1 |
| 6,438,538 B1 * | 8/2002 | Goldring | .............................. | 1/1 |
| 6,507,834 B1 * | 1/2003 | Kabra et al. | ................ | 707/718 |
| 6,741,980 B1 * | 5/2004 | Langseth et al. | ....................... | 1/1 |
| 6,873,995 B2 * | 3/2005 | Benson et al. | ................ | 707/607 |
| 7,069,271 B1 * | 6/2006 | Fadel et al. | .................... | 705/26.7 |
| 7,321,904 B2 * | 1/2008 | Holenstein et al. | ................... | 1/1 |
| 7,403,945 B2 * | 7/2008 | Lin et al. | .............................. | 1/1 |
| 7,497,370 B2 * | 3/2009 | Allen et al. | ................... | 235/375 |
| 7,587,435 B2 * | 9/2009 | Shepherd | .............................. | 1/1 |
| 7,634,477 B2 * | 12/2009 | Hinshaw | .............................. | 1/1 |
| 7,680,767 B2 * | 3/2010 | Adya et al. | ............. | 707/999.002 |
| 7,707,181 B2 * | 4/2010 | Guo et al. | ...................... | 707/636 |
| 7,765,186 B1 * | 7/2010 | Hu et al. | ....................... | 707/612 |
| 7,783,610 B2 * | 8/2010 | Lin et al. | ....................... | 707/689 |
| 7,805,423 B1 * | 9/2010 | Romine et al. | ................ | 707/704 |
| 7,853,561 B2 * | 12/2010 | Holenstein et al. | ........... | 707/611 |
| 7,953,698 B2 * | 5/2011 | Beck et al. | ....................... | 707/610 |
| 2002/0007363 A1 * | 1/2002 | Vaitzblit | ...................... | 707/202 |

* cited by examiner

*Primary Examiner* — Leslie Wong
(74) *Attorney, Agent, or Firm* — Sterne, Kessler, Goldstein & Fox PLLC (57) ABSTRACT

System, method, computer program product embodiments and combinations and sub-combinations thereof for logging of data manipulation language (DML) statements are described herein. An embodiment includes a database engine, a replication agent and a replication server which replicates data from the database engine to one or more replicate databases. The database engine writes parsed query information into a transaction log so that a process of replication agent may read the parsed query information and forward it to the replication server. The database engine writes all log records associated with a statement in a manner that allows the replication server to distinguish if those log records belong to same statement. In another embodiment, replication agent selectively sends SQL statement information to the replication server based on the replication server architecture.

15 Claims, 6 Drawing Sheets

STATEMENT LOGGING IN DATABASES

CROSS-REFERENCE TO RELATED APPLICATIONS

The present application is related to U.S. patent application Ser. No. 12/183,794, filed Jul. 31, 2008, and U.S. patent application Ser. No. 12/183,505, filed Jul. 31, 2008, both of which are incorporated herein by reference in their entireties.

BACKGROUND

1. Field of the Invention

The present invention relates to databases, and more particularly to database replication technology.

2. Background Art

Data replication is the process of maintaining up-to-date and multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively are online in a distributed system if a failure occurs.

Different solutions exist to obtain data from a source of modifications, for example a primary database, and to provide the data to a replicate or target database. In some cases, data may be replicated at a different intervals by obtaining a "snap-shot" of a source of data or a "snap-shot" of modifications to source data that is to be replicated. In some cases, a user may need a copy of data updated as soon as possible, in this case, to data is replicated as the modification is done on the primary database, without waiting for a process to obtain a snap-shot.

Data replication can be accomplished synchronously or asynchronously. In asynchronous replication, modifications to data at a primary database are replicated to replicate databases and the replicate or target database is updated only after a source at the primary database has been modified. Therefore, replication on the target database will occur after a delay of time, known as latency. An asynchronous replication solution can use different methods to transfer replication information. One benefit of asynchronous replication is minimal impact or intrusion to the primary database. The primary database does not need to wait until the replicated databases receive the data. As an example, the method used to extract changes from the primary database does not depend if the replication is asynchronous or synchronous.

Replication can use different methods to transfer data. Log based replication involves storing of the data modified by a data manipulation language (DML) statement into a log. A process may then read the log to extract and send information associated with the modified data to a replicate or target database. Statement replication includes transferring a data modification language statement itself to a replicate or target database. There is no data replication in such case, but data between a primary database and the replicate database continues to be in synchronization. In an exemplary case of statement replication, data associated with a statement is not transferred, but only the text of the statement travels around the replication system.

Statement replication has to ensure that the statement executed on the primary and replicate database will affect exactly the same set of data. But the results of a statement executed in the source database and replicate databases can be different depending on the replication architecture. For example, if data on a replicate database is a subset of data on the primary database, the same statement may affect a different set of data when it is replicated from the primary database to the replicate database. In such cases, DML replication will result in data at the primary and the replicate database being out of synchronization, which should be avoided.

Therefore, what is needed is a system, method and computer program product that logs and replicates DML statements in a manner that allows consistency between data in a primary database, and one or more replicate databases regardless of replication architecture.

BRIEF SUMMARY

Briefly stated, the invention includes system, method, computer program product embodiments and combinations and sub-combinations thereof for logging of data manipulation language (DML) statements.

An embodiment includes a database engine, a replication agent and a replication server which replicates data affected by the statement and the text of the statement from the database engine to one or more replicate databases. The database engine writes normalized statement information into a transaction log so that the replication agent process can read the normalized statement information and forward the information to the replication server. A database transaction may be composed by different statements. The database engine writes log records associated with the normalized statement in a way that allows replication system embodiments to distinguish data associated with the replicated statement. In this way, when the replication server later receives the log records from the replication agent, it may be able to select the method to be used for a specific target database, i.e. either replicate the statement text, or, if needed, the data modified by the statement on the primary database.

Further embodiments, features, and advantages of the invention, as well as the structure and operation of the various embodiments of the invention, are described in detail below with reference to accompanying drawings.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to systems, methods and computer program products for logging of data manipulation language (DML) statements for replication.

An embodiment includes a database engine, replication agent and a replication server which replicates data and statements from the database engine to one or more replicate databases. The database engine writes normalized query information into a transaction log. A process of replication agent reads the normalized query information and forwards the information to the replication server. The database engine writes log records associated with a statement in a manner that allows the replication server to distinguish log records that belong to same statement. In an embodiment, database engine selectively logs SQL DML statements, SQL DML statements that change a replicated table, SQL DML statements that categorization allows to be logged (deterministic SQL DML) and SQL DML statements that change more than a threshold number of rows (deferred logging).

In this way, when the replication server later receives the log records from replication agent 140, it can selectively apply individual log records of modifications or individual statements at the replicate database.

This detailed description of embodiments of the present invention is organized into several sections as shown by the following table of contents.

TABLE OF CONTENTS

1. System
2. Transaction Replication
3. Normalized SQL DML Operations
4. Logging Strategy and Wrapping Up Log Records
5. Deferred Logging
6. Example Computer Embodiment
7. Conclusion

1. System

Figure 1:
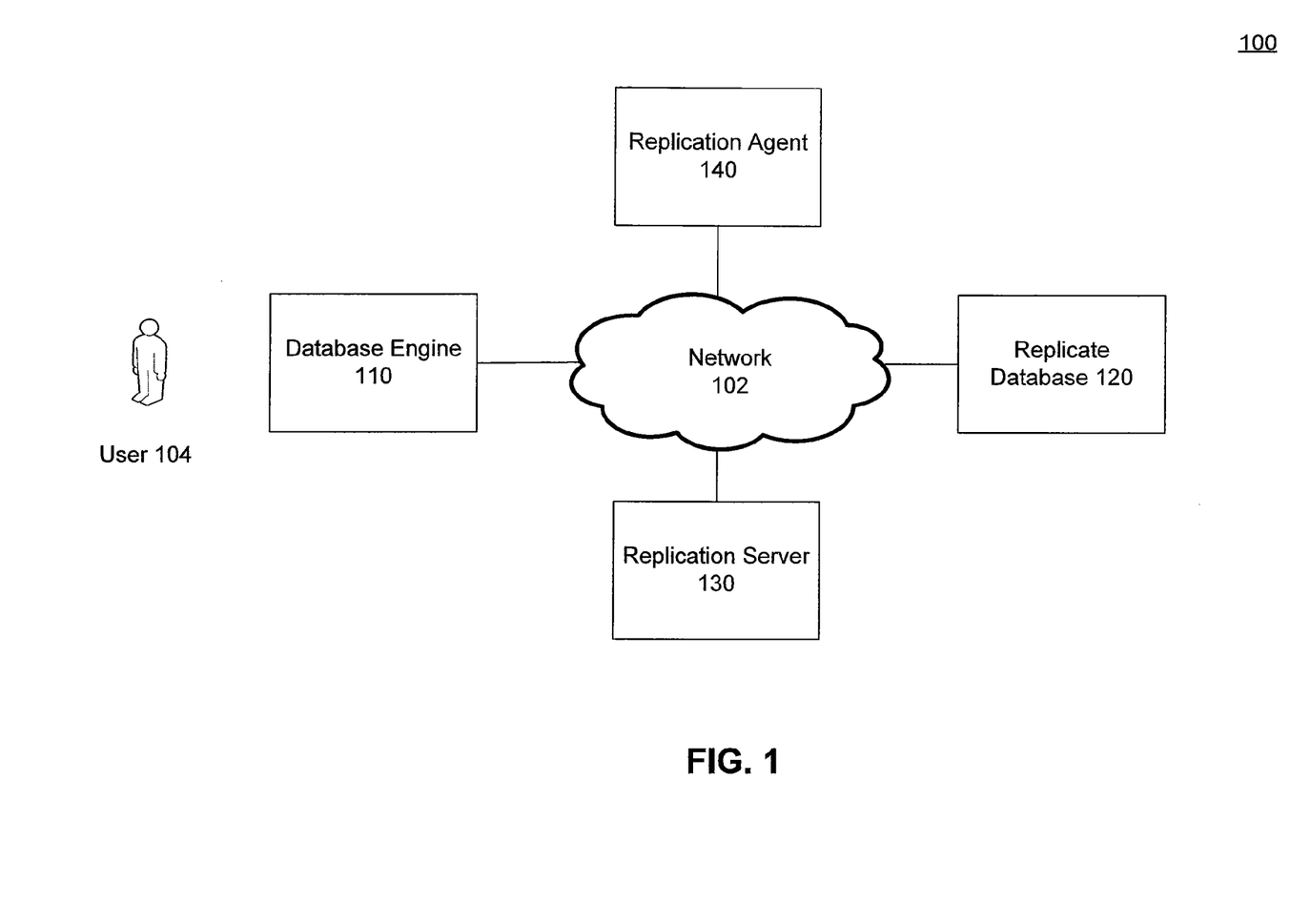
FIG. 1 is an architecture diagram of an exemplary replication environment, according to an embodiment of the invention.

This section describes an example system architecture for logging of data manipulation language (DML) statements (such as SQL DML statements), according to an embodiment of the invention as illustrated in FIG. 1.

FIG. 1 illustrates system 100 which includes database engine 110, replication agent 140, replication server 130 and replicate database 120. (While the following is described in terms of structured query language (SQL), the invention is not limited to this embodiment and other query languages or data manipulation languages may be used. The invention is applicable to any system having generally the structure of FIG. 1 or an equivalent thereof, or that would benefit from the functions as described herein.)

Database engine 110 may be any form of database and can include, but is not limited to, a device having a processor and memory for executing and storing instructions. Such a database engine may include software, firmware, and hardware or some combination thereof. The software may include one or more applications and an operating system. The hardware can include, but is not limited to, a processor, memory and user interface display. An optional input device, such as a mouse, stylus or any other pointing device, may be used.

Figure 2:
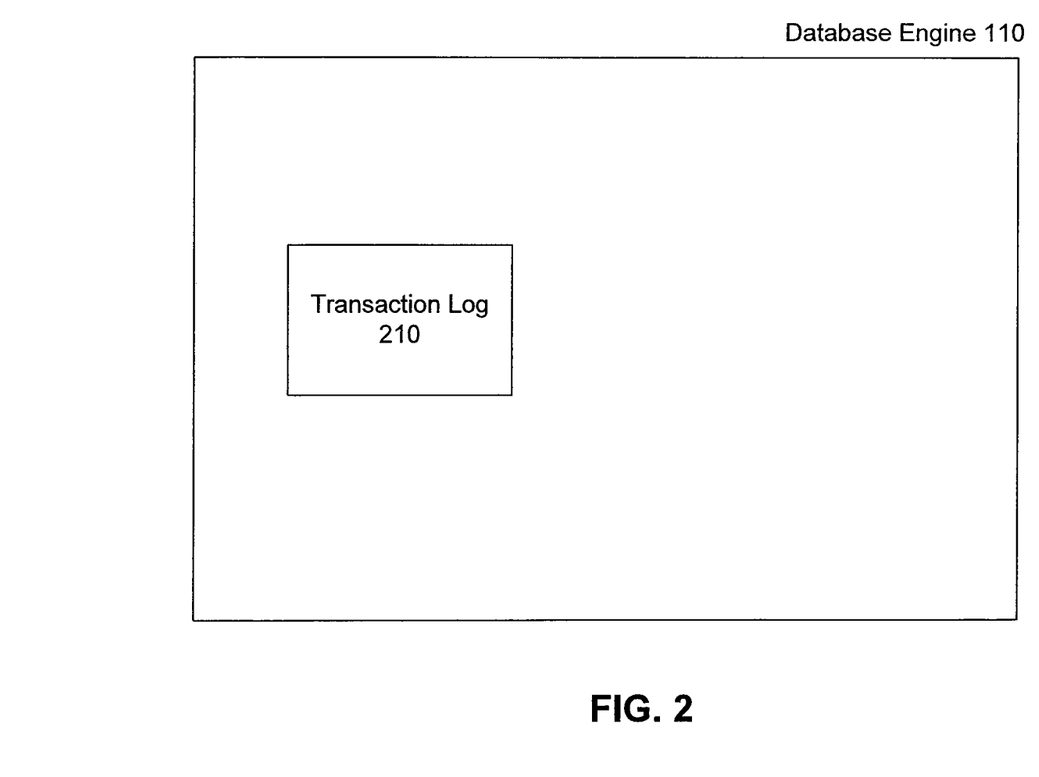
FIG. 2 is a diagram of database engine, according to an embodiment of the invention.

In an embodiment, database engine 110 is a source of transactions that modify data in the primary database 120. Tables marked for replication in a database engine 110 may be known as primary tables (not shown). When a table in database engine 110 is marked for replication, transactions that change the data in that table are captured for replication. Typically, a primary table is marked for replication so that replication agent 140 can identify and replicate transactions that affect data in the primary table excluding modifications on tables which don't want to be replicated. As shown in FIG. 2, database engine 110 may further include transaction log 210. Database engine 110 processes each transaction, and logs in a transaction log data affected by the transaction. Transaction log 210 is described further below.

Replication agent 140 may read transaction log records from transaction log 210, and then may send data affected by an operation to a replication server 130 for distribution to replicate database 120. In an embodiment, replication agent 140 may scan the transaction log 180 and convert the transaction log records directly into Log Transfer Language (LTL) commands. LTL commands are then sent to replication server 130 as they are logged. Replication server 130 may then provide transaction information to replicate database 120.

In an embodiment, replication agent 140 runs as a stand-alone application, independent of database engine 110, replication server 130, and any other replication system components. In another embodiment, replication agent 140 can be one or more threads running in database engine 110. In general, replication agent 140 may reside on the same host machine as, for example, database engine 110 or any other replication system component.

Replication server 130 may receive replicated operations from replication agent 140. In an embodiment, replication server 130 may send replicated operations to replicate database 120 in response to one or more commands from replication agent 140. As an example, when a replicated transaction is processed successfully by replicate database 120, replicate database 120 is synchronized with data in database engine 110. As an example, replication server 130 instantiates a separate replication agent process for each database engine that it is associated with.

Network 102 can be any type of network or combination of networks such as, but not limited to, a local area network, wide area network or the Internet. Network 102 may be any form of a wired network or a wireless network, or a combination thereof. Network 102 may allow database engine 110, replication server 130, replication agent 140 and replicate database 120 to communicate with each other.

Figure 3:
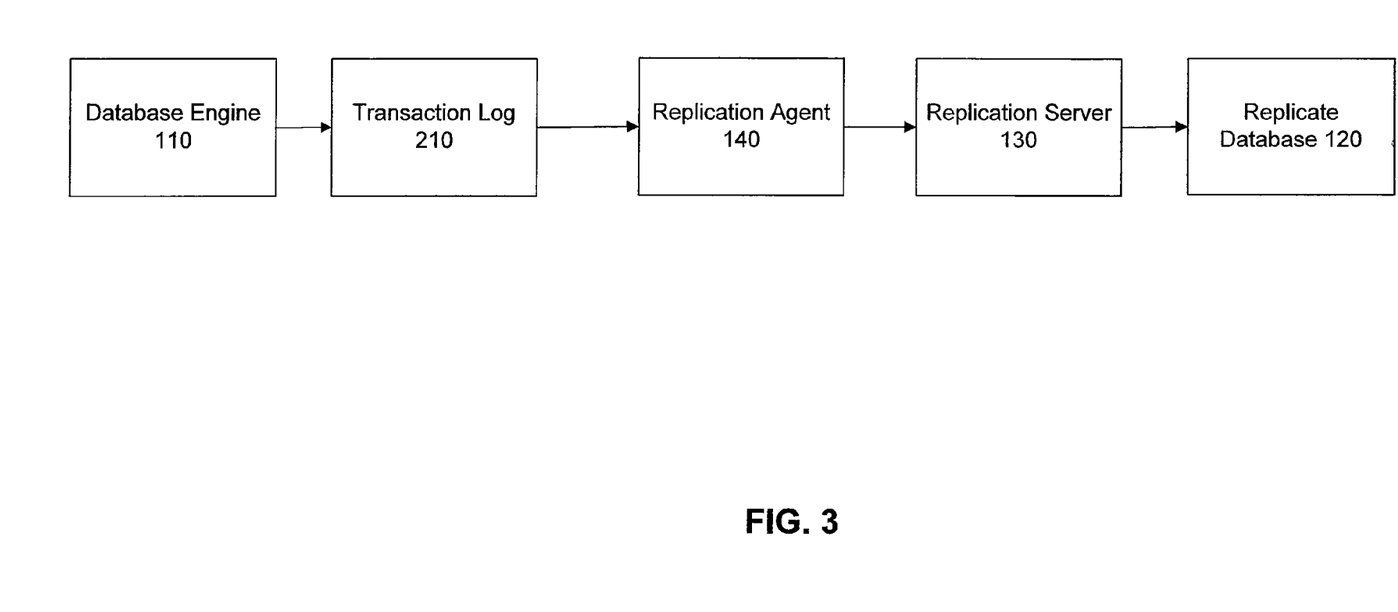
FIG. 3 is a flow diagram illustrating the operation of the system described in FIG. 1, according to an embodiment of the invention.

FIG. 3 is a flow diagram illustrating an exemplary flow of communication between database engine 110, transaction log 210, replication agent 140, replication server 130 and replicate database 120.

Referring to FIG. 3, when a table in database engine 110 is marked for replication, transactions that change the data in that table are captured for replication. Database engine 110 processes each modification, and a copy of each atomic change is stored in transaction log 210. Replication agent 140 may then read modifications done on replicated tables from transaction log 210, and then may send changes to be replicated to replication server 130 for distribution to replicate database 120.

In this way, replication related data and other data may be communicated within system 100.

2. Transaction Replication

Events captured for replication through system 100 may be referred to as transactions. If a transaction affects both marked tables and unmarked tables, operations that affect the marked tables are captured for replication. Operations on unmarked tables are not captured for replication. Data-changing operations captured for replication exist within a transaction context.

Replication agent 140 reads transaction log 210 in database engine 110 and generates Log Transfer Language (LTL) output that allows replication server 130 to process and distribute replicated transactions throughout a system 100. Replication server 130 may apply only committed transactions to the replicated database engine 120.

3. Normalized SQL DML Operations

In an embodiment, replication server 130 needs to receive a DML operation that has been logically separated or parsed into different sections. Examples of such DML operations include INSERT SELECT, UPDATE, DELETE and SELECT INTO operations, described herein for the purposes of illustration, not limitation.

In an embodiment, a DML statement may be parsed by database engine 110 based on statement clauses that include, but are not limited to those illustrated by Table 1.

TABLE 1

| Statement Parameter | Exemplary Purpose |
| --- | --- |
| Table name | Used to indicate a table name. |
| Owner name | Used to indicate an owner name. |
| SET section | Used to indicate columns changed in an UPDATE statement. |
| WHERE section | Used to indicate a "WHERE" clause. |
| SELECT section | Used to indicate a "SELECT" clause belonging to an "INSERT INTO" statement. |

For example, consider the statement:

UPDATE user1.tab SET c=x WHERE col=1

Instead of receiving the statement in the above form, replication server 130 receives the above statement after it has been parsed.

Once the statement shown above has been normalized, it assumes the following parsed format:

TYPE: update
TABLE: tab
OWNER: user1
SET: c=x
WHERE: col=1

In summary, the database engine on the primary site 110 parses and normalizes the original statement, and logs it in the transaction log, later on replication server 130 receives the SQL DML statement information structured and logically separated into different sections.

Furthermore, the normalized statement is logged in the transaction log as parameters of a fake or virtual replicated stored procedure. This includes a begin marker indicating the beginning of the statement and an end marker indicating the statement has finished its execution. This approach yields an extensible framework for replication where new information may encapsulated as a new parameter to such a virtual or fake stored procedure.

As an example, replication server 130 may use the stored procedure parameters listed in Table 2.

TABLE 2

| Parameter | Exemplary Purpose |
| --- | --- |
| rs_operator | Can be set to UPDATE, DELETE, INSERT SELECT, SELECT INTO to indicate the nature of the statement. |
| rs_object | Used to indicate a table name. |
| rs_owner | Used to indicate an owner name. |
| rs_set | Used to indicate a "SET" clause in an UPDATE statement. |
| rs_where | Used to indicate a "WHERE" clause in a statement. |
| rs_select | Used to indicate "SELECT" clause in a SELECT INTO or INSERT SELECT statement. |
| rs_from | Used to indicate a "FROM" clause in a SELECT INTO or INSERT SELECT statement. |
| rs_column | Used to indicate a column list in an INSERT SELECT statement. |

In addition to information in parsed SQL DML statements, replication server 130 may need the information illustrated in Table 3.

TABLE 3

| Parameter | Exemplary Purpose |
| --- | --- |
| rs_rowcount | The number rows changed by the SQL DML statement at source database. |
| rs_status | To indicate context information for SQL statement replication. |
| rs_category | To indicate a category of the query. |

In an embodiment, replication server 130 will use rs_rowcount to verify if the SQL DML statement changes the same numbers of rows at the target database as the primary database. If it is not changing the same numbers of rows at the target database, users are provided with a way to log a warning message, log and skip the transaction, or stop replication.

Another consequence of row change replication is "primary key modification." If a primary key is changed, SQL DML is logged even if it changes less then a threshold number of rows. This is because a row change replication issues.

Consider for example a table T (i int), where 'i' is the primary key.

{1}
{2}
{3}

If the statement, UPDATE T set i=i+1 is executed, for row change replication, we have:

UPDATE T set i=2 where i=1

UPDATE T set i=3 where i=2

UPDATE T set i=4 where i=3

In the example shown above every single UPDATE statement will attempt to change the value of the primary key with an existing value. This approach will lead to errors.

As an example, consider the first UPDATE statement, reproduced below:

UPDATE T set i=2 where i=1

The execution of this statement will result in an error as there is already a row with the value 2 for column i. In this case traditional log record modifications cannot be used, resulting in the need to use statement replication.

Consider, for example, the following SQL DML query:

UPDATE user1.tab set c=x WHERE col=1,

In order to replicate the above query, replication agent 140 sends the information as an execution of a stored procedure where the query information is split into different parameters to emulate execution of the stored procedure. Thus, referring to Table 1 and Table 2, replication agent 140 sends this information as follows:

exec rs_sqldml @rs_operator='U',

@rs_object='tab',

@rs_owner='user1'

@rs_set='c=x'

@rs_where='col=1', (rs_category=100

4. Logging Strategy and Wrapping Up Log Records

In an embodiment, once a query has been parsed and normalized, normalized query information needs to be stored in transaction log 210 so that a process of replication agent 140 may read it and forward it to replication server 130.

Consider two clients executing SQL DML operations in a database engine at the same time, as shown by Table 4 below.

TABLE 4

| Client 1 | Client 2 |
|---|---|
| begin tran T1 | begin tran T2 |
| delete t1 where c > 5 and d> 10 | insert t1 values (6.7, 0.7) |
| delete t1 where price < 0.5 | commit tran |
| commit tran | |

Once both client 1 and client 2 commit transactions T1 and T2, transaction log 210 will include:

BEGIN TRANSACTION T1
DELETE ROW #1 t1
DELETE ROW #2 t1
BEGIN TRANSACTION T2
INSERT ROW #3 t1
DELETE ROW #4 t1
INSERT ROW #1 T2
DELETE ROW #5 t1
END TRANSACTION T2
DELETE ROW #6 t1
DELETE ROW #7 t1
END TRANSACTION T1

In a transaction log, every log record associated with a modification has its own transaction ID. Thus, even if log records for different transactions are intercepted and read, a transaction associated with the log records can be identified by replication agent 140. Every log record and consequently every LTL generated for a specific log record will have the identification about the transaction it belongs to.

In an embodiment, database engine 110 uses a single transaction log 210 where all modifications are sequentially stored. Transactions are interspersed in transaction log 210. A single transaction may contain the execution of several statements where the modifications on every row affected appear sequentially, without any distinction when a statement has started or finished.

Following the previous example, the log records associated with transaction T1 include:

BEGIN TRANSACTION T1
DELETE ROW #1 t1
DELETE ROW #2 t1
DELETE ROW #3 t1
DELETE ROW #4 t1
DELETE ROW #5 t1
DELETE ROW #6 t1
DELETE ROW # 7 t1
END TRANSACTION T1

In the above log records from transaction T1, it may not be possible for replication server 130 to identify when the first DELETE statement in transaction T1 begins and finishes.

Continuing with the previous example, consider now that the first DELETE statement in the transaction affects a considerable number of rows, while the second DELETE only affects one row. Furthermore, consider that for the first DELETE statement, replication server 130 may want to replicate the DELETE statement itself instead of the individual log records associated with the statement, while for the second DELETE statement replication server 130 may want to replicate individual log records. Thus, in order to distinguish two different statements in one transaction, database engine 110 "wraps up" log records so that replication server 130 can determine when a specific statement starts and finishes and chose the appropriate method.

As an example, wrapping up of log records may be accomplished by using two log records, a begin marker and an end marker, both of which are also used to log the execution of a virtual stored procedure.

The begin marker log record is used to log information related to the statement. If all the information related to the statement cannot be logged with a single begin marker, several log records of this type will be used, till all the information needed is logged.

When a SQL DML statement starts, begin marker log record is logged. Additionally, when a statement completes execution, an end marker log record is logged by database engine 110 in transaction log 210.

To illustrate the above, transaction T1 can be logged as:

BEGIN TRANSACTION
BEGIN MARKER
DELETE ROW #1 t1
DELETE ROW #2 t1
DELETE ROW #3 t1
DELETE ROW #4 t1
DELETE ROW #5 t1
DELETE ROW #6 t1
END MARKER
 DELETE ROW #7 t1
END TRANSACTION

In summary, database engine 110 writes transaction log records and "wraps up" log records, modified by a statement in a manner that allows the replication server 130 to distinguish if those log records belong to same statement. In this way, when the replication server 130 later receives the generated LTL matching the log records from transaction log 210, it may be able to selectively apply individual log records of modifications or individual statements at replicate database 120, but not both at the same time.

In an embodiment, DML statements, for example SQL DML statements, are logged in a manner that includes logical markers to indicate the beginning and the end of a statement within transaction log 210. Thus, in general terms, for log records associated with each statement in transaction log 210, database engine 110 will log a begin record marker and an end record marker.

In an embodiment, begin and end markers are logged in a manner similar to logging a replicated stored procedure. Thus, each portion of the parsed and normalized statement is associated with the parameter of a fake or virtual replicated stored procedure. Such a virtual stored procedure is used for the sole purpose of replication. The virtual stored procedure includes a number of parameters. The parameters include SQL statements that are normalized and logically divided into separate parts by different clauses as described in Section 3. Further detail regarding statement categorization and statement normalization is found in co-pending, commonly-owned U.S. patent application Ser. No. 12/183,794, titled "Statement Categorization and Normalization", which is herein incorporated by reference in its entirety.

Figure 4:
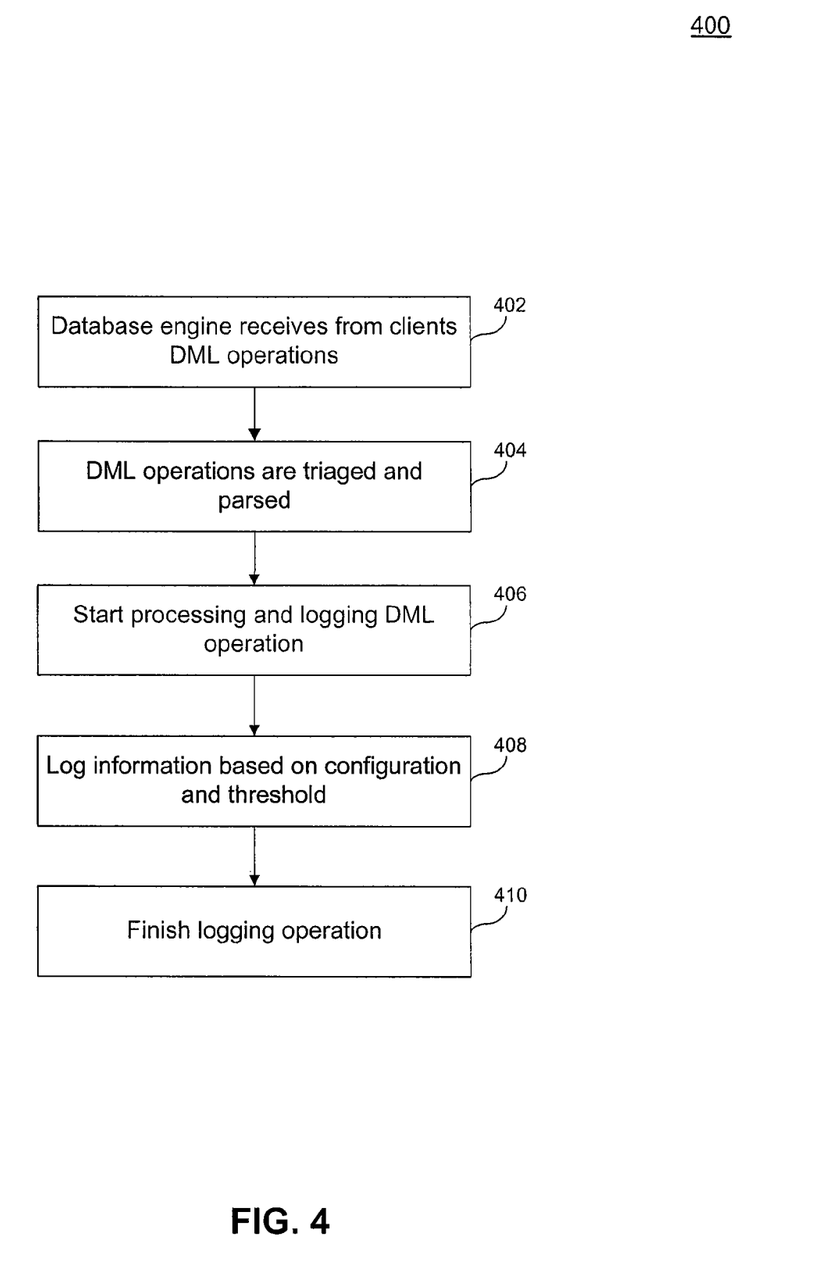
FIG. 4 is a flowchart illustrating the operation of logging, according to an embodiment of the invention.

The operation of logging according to an embodiment of the invention will now be described with reference to flowchart 400 in FIG. 4.

In step 402, database engine 110 receives DML operations from clients. Clients are connected to the database engine and are executing DML statements.

In step 404, DML operations are triaged and parsed. Based on the table configuration, the database engine will parse statements.

In step 406, processing and logging of DML operations is started.

In step 408, information is logged based on configuration and statement threshold.

In step 410 the logging operation is completed.

Logging records in this manner allows replication server 130 to distinguish between log records that belong to a particular statement so that replication server 130 can use the individual log records and apply statement replication depending upon the replication configuration used for log-based replication.

5. Deferred Logging

In replication environments where DML statements affect a few number of rows, the effort of writing additional log records and sending individual log records and information for DML statement replication to replication server 130, may be substantially high to gain benefit in terms of performance.

Database engine 110 determines a need to log a SQL DML statement, when, for example, the SQL DML statement changes a replicated table and it is not a category C3 SQL DML statement. (Further detail regarding statement categorization is found in co-pending, commonly-owned U.S. patent application Ser. No. 12/183,794, titled "Statement Categorization and Normalization", which is herein incorporated by reference in its entirety.) However, database engine 110 will not log a SQL DML statement at once, but initially starts logging the atomic changes performed by the SQL DML statement. During this executing phase, it monitors the number of rows impacted by the SQL DML statement. Once the number of impacted rows reaches to a predefined threshold, database engine logs a begin marker. The end marker will then be logged once the statement has completed, with the information about the exact number of rows modified by the statement.

In an embodiment the beginning of an SQL DML statement i.e. the first row change that belongs to an SQL DML statement may be identified by the following embodiments.

In another embodiment, for any first row changes, special status is put in the log to indicate that a row is the first row of a statement. Effectively, this serves as a begin marker.

As an example, not intended to limit the invention, the configurable threshold may be set to 10 rows or 100 rows or any other number of rows depending on an administrator of database engine 110. Thus, statements are not logged by database engine 110 until the number of rows that are to be modified by a statement exceeds the configurable threshold.

As the begin marker indicating the start of a statement is deferred till the number of rows affected by the statement reaches a threshold, it is necessary to identify in the log the first record for a specific statement. In an embodiment, when the first row of a table modified by a statement is logged, a marker is placed with the log record to identify it as being the first individual modification for a specific statement and transaction in transaction log 210. Then all subsequent log records modifications are logged until the configurable threshold is reached. The database engine 110 logs the begin marker afterwards for the statement with the information describing it. The logging process will continue till the statement has finished and the end marker is logged. An example illustrating the above is shown below.

```
BEGIN TRANSACTION
DELETE ROW #1 t1 (marked as first)
DELETE ROW #2 t1
DELETE ROW #3 t1
BEGIN MARKER
DELETE ROW #4 t1
DELETE ROW #5 t1
DELETE ROW #6 t1
END MARKER
DELETE ROW #7 t1
END TRANSACTION
```

If the number of rows affected by a statement in a transaction does not reach the configured threshold, the database engine 110 will not log information for SQL statement replication.

Figure 5:
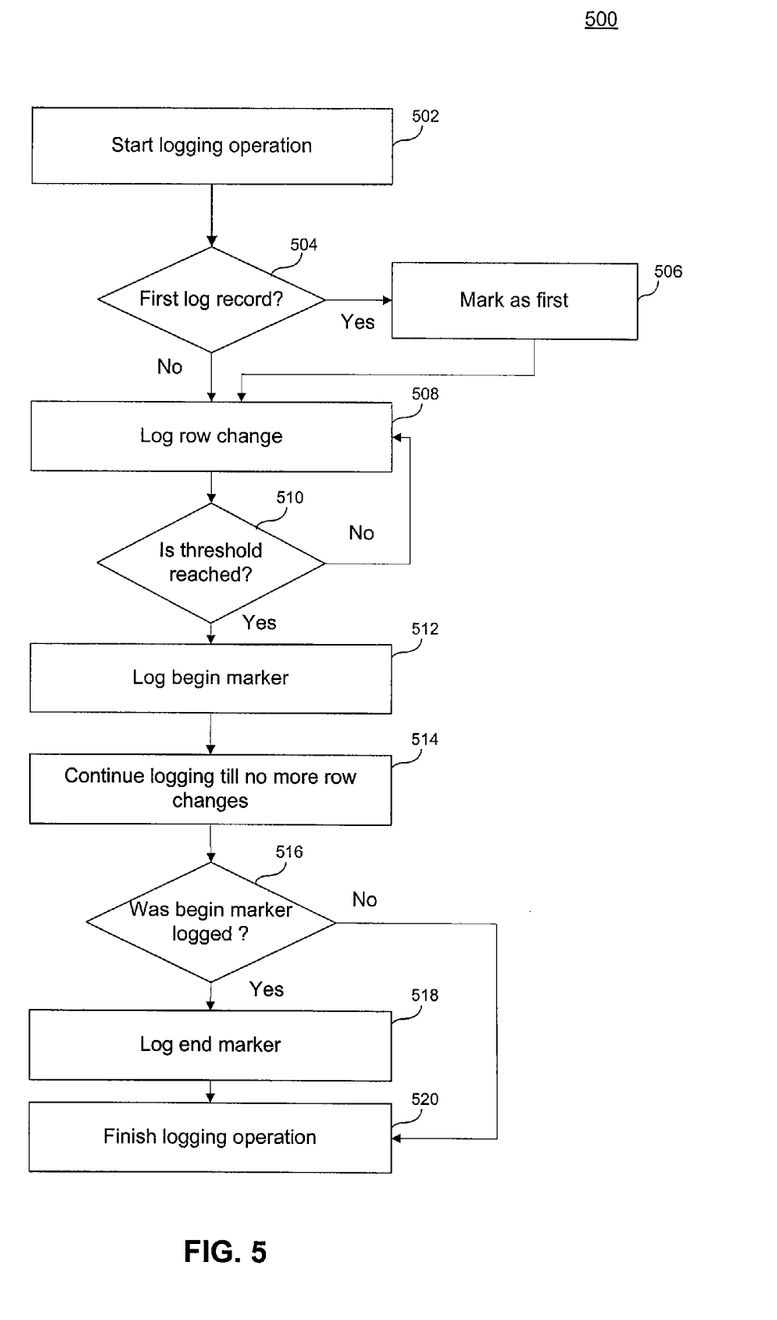
FIG. 5 is a flowchart illustrating deferred logging, according to an embodiment of the invention.

The logging operation based on a threshold, according to an embodiment of the invention will now be described with reference to flowchart 500 in FIG. 5.

In step 502, a logging operation is started.

In step 504, the method checks if the first log record is being logged (step 504). If the first log record is being logged it is marked as first (step 506) and method 500 proceeds to step 508. If the first log record is not being logged (step 504), then a row change is logged (step 508).

In step 510, the method checks if a threshold has been reached. If a threshold has been reached (step 510), a begin marker is logged (step 512). If a threshold has not been reached (step 510), step 508 is performed.

In step 514, logging is continued till there are no more row changes.

In step 516, the method checks if a begin marker was logged. If a begin marker was logged (step 516), an end marker is logged (step 518). If a begin marker is not logged (step 516), the logging operation is completed (step 520).

In this way, the effort of writing additional log records and sending individual log records and information for DML statement replication may be avoided and may improve replication performance.

6. Example Computer Embodiment

Figure 6:
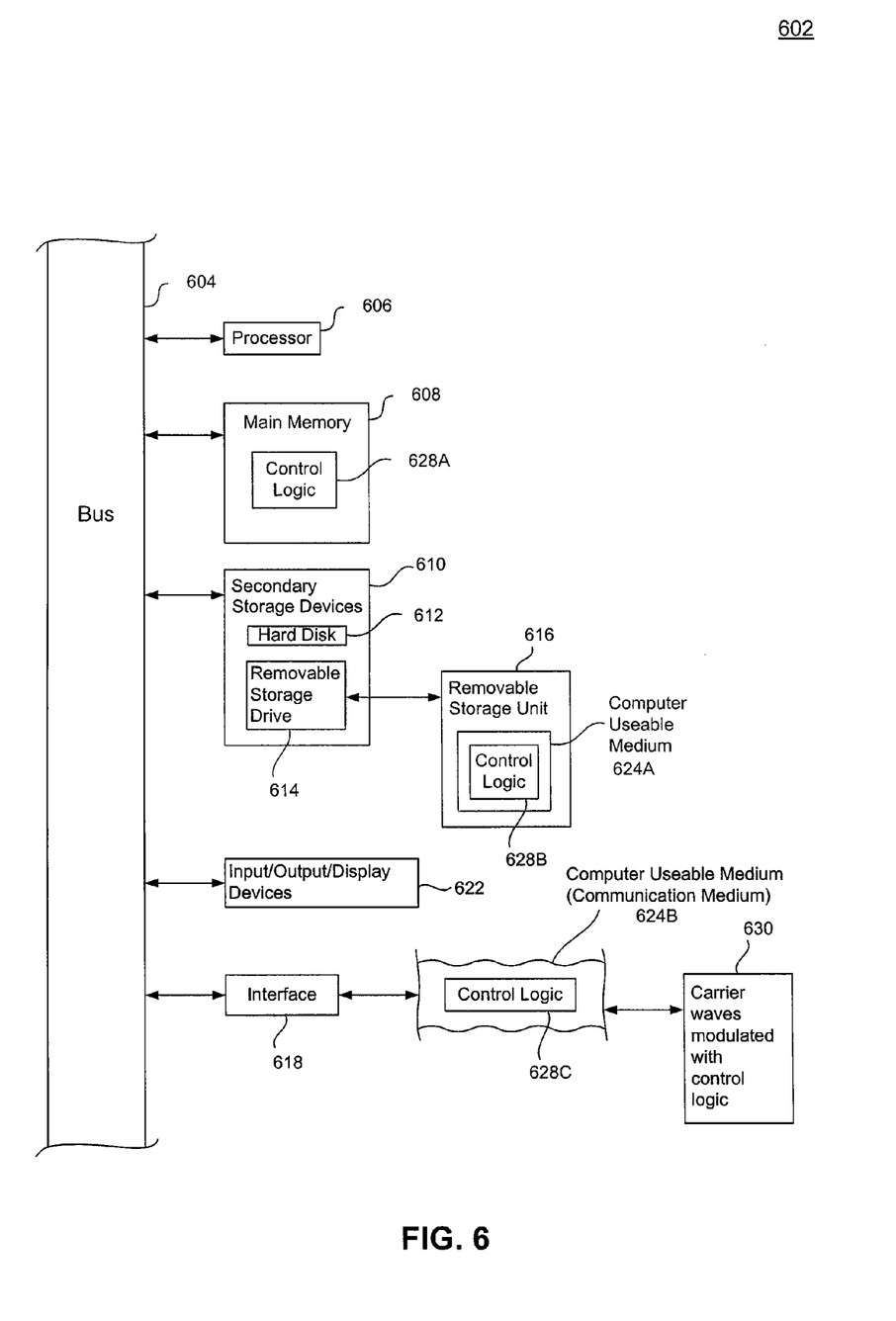
FIG. 6 illustrates an example computer useful for implementing components of embodiments of the invention.

In an embodiment of the present invention, the system and components of embodiments described herein are implemented using well known computers, such as computer 602 shown in FIG. 6. For example, replication agent 140 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 626A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 616. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

7. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited.

What is claimed is:

1. A method for replicating a data manipulation language (DML) statement, comprising:
    receiving a DML statement for replication;
    associating one or more components of said DML statement with corresponding parameters of a stored procedure;
    selectively logging information associated with said DML statement when a number of rows affected by said DML statement in a log record reaches a configurable threshold; and
    transmitting said stored procedure to a replication server for execution, said stored procedure including one or more executable parameters, said parameters associated with respective components of said DML statement, said execution of said stored procedure causing replication of said DML statement.

2. The method of claim 1, further comprising:
logging one or more database operations associated with said DML statement in a database transaction log; and
encapsulating said one or more database operations associated with said DML statement using at least a begin record marker and an end record marker to enable said replication server to distinguish said one or more database operations from other database operations in said database transaction log.

3. The method of claim 2, further comprising:
transmitting said database transaction log to said replication server.

4. The method of claim 2, wherein said one or more database operations or individual statements are selectively applied at a replicate database.

5. The method of claim 1, wherein said logging step comprises:
placing a marker to identify a first log record logged for said DML statement.

6. A system for replicating a data manipulation language (DML) statement, comprising:
a first module configured to receive a DML statement for replication;
a second module configured to associate one or more components of said DML statement with corresponding parameters of a stored procedure;
a third module configured to selectively log information associated with said DML statement when a number of rows affected by said DML statement in a log record reaches a configurable threshold; and
a fourth module configured to transmit said stored procedure to a replication server for execution, said stored procedure including one or more executable parameters, said parameters associated with respective components of said DML statement, said execution of said stored procedure causing replication of said DML statement.

7. The system of claim 6, further comprising:
a fifth module configured to log one or more database operations associated with said DML statement in a database transaction log; and
a sixth module configured to encapsulate said one or more database operations associated with said DML statement using at least a begin record marker and an end record marker to enable said replication server to distinguish said one or more database operations from other database operations in said database transaction log.

8. The system of claim 7, further comprising:
a seventh module configured to transmit said database transaction log to said replication server.

9. The system of claim 7, further comprising:
a seventh module configured to selectively apply said one or more database operations or individual statements at a replicate database.

10. The system of claim 8, further comprising a eighth module configured to place a marker to identify a first log record logged for said DML statement.

11. A computer program product including a non-transitory computer-readable medium having instructions stored thereon that, when executed by a computing device, cause the computing device to perform operations comprising:
receiving a DML statement for replication;
associating one or more components of said DML statement with corresponding parameters of a stored procedure;
selectively logging information associated with said DML statement when a number of rows affected by said DML statement in a log record reaches a configurable threshold; and
transmitting said stored procedure to a replication server for execution, said stored procedure including one or more executable parameters, said parameters associated with respective components of said DML statement, said execution of said stored procedure causing replication of said DML statement.

12. The computer program product of claim 11, the operations further comprising:
logging one or more database operations associated with said DML statement in a database transaction log; and
encapsulating said one or more database operations associated with said DML statement using at least a begin record marker and an end record marker to enable said replication server to distinguish said one or more database operations from other database operations in said database transaction log.

13. The computer program product of claim 12, the operations further comprising:
transmitting said database transaction log to said replication server.

14. The computer program product of claim 12, wherein said one or more database operations or individual statements are selectively applied at a replicate database.

15. The computer program product of claim 11, said logging comprising:
placing a marker to identify a first log record logged for said DML statement.

* * * * *